Aug. 6, 1957 F. S. MALICK 2,802,169

MAGNETIC AMPLIFIER CONTROL APPARATUS

Filed Nov. 5, 1954 2 Sheets-Sheet 1

MAGNETIC AMPLIFIER CONTROL APPARATUS

Filed Nov. 5, 1954 2 Sheets-Sheet 2

WITNESSES

Edwin E. Bassler

K. W. Thomas

INVENTOR

Franklin S. Malick

BY

Ezra W. Savage

ATTORNEY

United States Patent Office 2,802,169

Patented Aug. 6, 1957

2,802,169

MAGNETIC AMPLIFIER CONTROL APPARATUS

Franklin S. Malick, Milwaukee, Wis., assignor to Westinghouse Electric Corporation, East Pittsburgh, Pa., a corporation of Pennsylvania Application November 5, 1954, Serial No. 467,127

8 Claims. (Cl. 323—89)

This invention relates to magnetic amplifiers and more particularly to means for preventing a magnetic amplifier from being driven beyond its cutoff value.

When a magnetic amplifier, such as a self-saturating magnetic amplifier, is driven beyond its cutoff value, certain undesirable results are produced. For instance, if the magnetic amplifier is a single-ended amplifier, the magnitude of the output current will increase once the cutoff value for the magnetic amplifier is exceeded. On the other hand, if the magnetic amplifier is of the push-pull type, the magnitude of the output current of the magnetic amplifier will decrease once the cutoff value for one side of the push-pull magnetic amplifier is exceeded. Thus, in either the case of the single-ended amplifier or the push-pull amplifier, the same value of output current will be produced for more than one value of control ampere-turns.

The reason that a magnetic amplifier, such as the self-saturating magnetic amplifier, is driven beyond its cutoff value is that too large a number of control ampere-turns are applied to the magnetic amplifier. Such a large number of control-ampere turns are produced, for instance, by controlling the magnetic amplifier from a potentiometer bridge. Thus, in order to prevent the magnetic amplifier from being driven beyond its cutoff value, some means must be provided to cancel out the control ampere-turns above the value required to cut off the magnetic amplifier.

An object of this invention is to provide for preventing a magnetic amplifier from being driven beyond its cutoff value, to thereby prevent the magnetic amplifier from increasing the magnitude of its output current after it has reached a minimum value and thus prevent the production of the same output value for more than one value of control ampere-turns.

Another object of this invention is to provide for automatically adjusting the bias ampere-turns of a magnetic amplifier so that its control ampere-turns above the value required to cut off the magnetic amplifier are canceled out, to thereby prevent the magnetic amplifier from being driven beyond its cutoff value.

A specific object of this invention is to provide for so interconnecting a compensating magnetic amplifier in circuit relationship with the main magnetic amplifier that both magnetic amplifiers are controlled from the same control source and the output of the compensating magnetic amplifier controls the number of bias ampere-turns on the main magnetic amplifier, to thereby prevent the main magnetic amplifier from being driven beyond its cutoff value.

A more specific object of this invention is to provide for preventing excessive control ampere-turns on a magnetic amplifier, by canceling out the excessive control ampere-turns with bias ampere-turns which are controlled in accordance with the threshold voltage of a device which effects the desired number of bias ampere-turns once the control ampere-turns become excessive.

Another more specific object of this invention is to provide for preventing a main magnetic amplifier from being driven beyond its cutoff value by canceling out the excessive control ampere-turns with bias ampere-turns which are controlled in accordance with a compensating magnetic amplifier which is biased to cutoff and effects the desired number of bias ampere-turns on the main magnetic amplifier once the control ampere-turns applied to the main magnetic amplifiers become excessive.

Other objects of this invention will become apparent from the following description when taken in conjunction with the accompanying drawings, in which.

Figure 1:
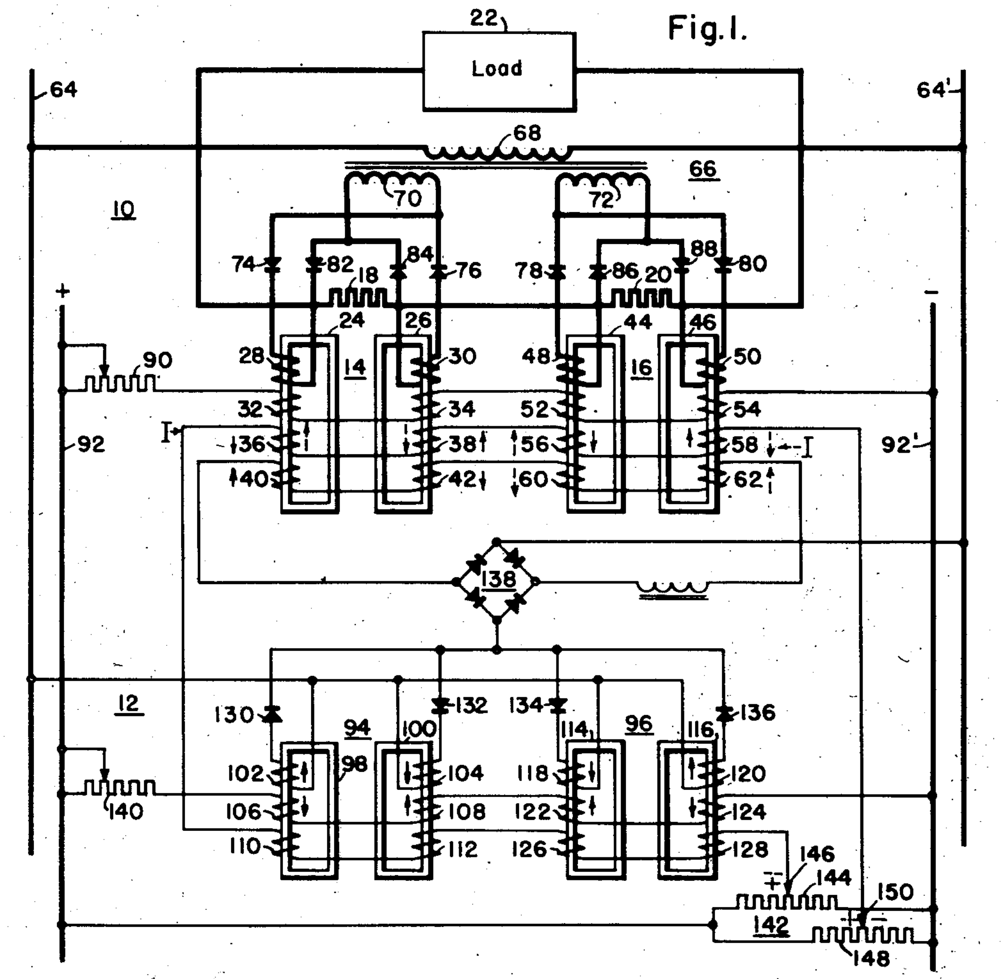
Fig. 1 is a schematic diagram of circuits and apparatus illustrating one embodiment of the teachings of this invention.

Referring to Fig. 1, this invention is illustrated by reference to a main or push-pull magnetic amplifier 10 of the self-saturating type. However, it is to be understood that this invention is equally applicable to a single-ended magnetic amplifier of the self-saturating type, or to a single-ended magnetic amplifier whose characteristic curve is of a shape similar to that produced by a self-saturating magnetic amplifier. For instance, magnetic amplifiers of the non self-saturating type having sufficient positive feedback have such a characteristic curve.

In accordance with a teaching of this invention, a compensating magnetic amplifier 12 of the self-saturating type cooperates with the push-pull magnetic amplifier 10 in order to prevent either side of the push-pull magnetic amplifier 10 from being driven beyond its cutoff value. Although the compensating magnetic amplifier 12 illustrated comprises two full-wave self-saturating magnetic amplifiers, it is to be understood that if the compensating magnetic amplifier was controlling a single-ended magnetic amplifier (not shown), then it would only be necessary to provide a single magnetic amplifier (not shown) for the compensating magnetic amplifier. However, the compensating magnetic amplifier (not shown) should be such as to produce an output current which varies linearly with changes in the magnitude of the control current applied thereto.

In general, the push-pull magnetic amplifier 10 comprises two full-wave bridge-type magnetic amplifiers 14 and 16. In operation, the outputs of the magnetic amplifiers 14 and 16 are applied to load resistors 18 and 20, respectively. The load resistors 18 and 20 are so interconnected with one another and with a load 22 that the difference in the voltages appearing across the load resistors 18 and 20 is applied to the load 22.

In this instance, the bridge-type magnetic amplifier 14 comprises magnetic core members 24 and 26 which have disposed in inductive relationship therewith load windings 28 and 30, respectively, bias windings 32 and 34, respectively, control windings 36 and 38, respectively, and auxiliary bias or compensating windings 40 and 42, respectively. In practice, the bias windings 32 and 34 are so disposed on their respective magnetic core members 24 and 26 that current flow therethrough produces a magnetomotive force that opposes the magnetomotive force produced by the current flow through the associated load windings 28 and 30, respectively. As is customary in a push-pull magnetic amplifier, the control windings 36 and 38 are so disposed on their respective magnetic core members 24 and 26 that when current flows in one direction through the control windings 36 and 38 the output current of the bridge-type magnetic amplifier 14 decreases, and when the current in the windings 36 and 38 flows in the opposite direction, the output current of the bridge-type magnetic amplifier 14 increases. In other words, depending upon the direction of the current flow through the control windings 36 and 38, the magnetomotive force produced thereby either opposes or aids the magnetomotive force produced by the current flow through the associated load windings 28 and 30. According to the invention the auxiliary bias windings 40 and 42 are so disposed on their respective magnetic core members 24 and 26 that when the current flow through the control windings 36 and 38 is tending to drive the bridge-type magnetic amplifier 14 beyond cutoff, the current flow through the auxiliary bias windings 40 and 42 effects a magnetomotive force in the respective core members 24 and 26 which opposes the magnetomotive force being produced by the current flow through the associated control windings 36 and 38, respectively.

The bridge-type magnetic amplifier 16 comprises magnetic core members 44 and 46 which have disposed in inductive relationship therewith load windings 48 and 50, respectively, bias windings 52 and 54, respectively, control windings 56 and 58, respectively, and auxiliary bias or compensating windings 60 and 62, respectively. In practice, the bias windings 52 and 54 are so disposed on their respective magnetic core members 44 and 46 that current flow therethrough produces a magnetomotive force in the core members 44 and 46 that opposes the magnetomotive force produced by the current flow through the associated load windings 48 and 50, respectively. As was the case with the control windings 36 and 38 of the bridge-type magnetic amplifier 14, the control windings 56 and 58 are so disposed on their respective magnetic core members 44 and 46 that when current flows in one direction through the control windings 56 and 58, a magnetomotive force is produced in the respective magnetic core members 44 and 46 which opposes the magnetomotive force produced by the current flow through the associated load windings 48 and 50, respectively. On the other hand, when current flows in the opposite direction through the control windings 56 and 58, the opposite effect is produced, namely, the magnetomotive force produced by the current flow through the control windings 56 and 58 aids the magnetomotive force produced by the current flow through the associated load windings 48 and 50, respectively. According to the invention the auxiliary bias windings 60 and 62 are so disposed on their respective magnetic core members 44 and 46 that when the current flow through the control windings 56 and 58 is in such a direction as to tend to drive the bridge-type magnetic amplifier 16 beyond its cutoff value, the current flow through the auxiliary bias windings 60 and 62 produces a magnetomotive force which opposes the magnetomotive force produced by the current flow through the control windings 56 and 58.

Energy for the bridge-type magnetic amplifiers 14 and 16 is received from conductors 64 and 64′ which have applied thereto an alternating-current supply voltage. In particular, a potential transformer 66 having a primary winding 68 and two secondary winding sections 70 and 72 is interconnected with the conductors 64 and 64′ to supply energy to the magnetic amplifiers 14 and 16.

As is well known in the art self-saturation is obtained for the bridge-type magnetic amplifier 14 by connecting self-saturating rectifiers 74 and 76 in series circuit relationship with the load windings 28 and 30, respectively. In like manner, in order to produce self-saturation for the bridge-type magnetic amplifier 16, self-saturating rectifiers 78 and 80 are connected in series circuit relationship with the load windings 48 and 50, respectively. One end of the series circuit including the load winding 28 and the self-saturating rectifier 74 is connected to the left end of the load resistor 18, as illustrated, and the other end of the series circuit is connected to the right end of the secondary winding section 70, as illustrated. On the other hand, the series circuit including the load winding 30 and the self-saturating rectifier 76 is connected to the other end of the load resistor 18, and the other end of the series circuit is connected to the right end of the secondary winding section 70 of the transformer 66. Thus, the load windings 28 and 30 are energized from the supply voltage applied to the conductors 64 and 64′ and are interconnected with the load resistor 18 and thus with the load 22. The series circuits including first the load winding 48 and the self-saturating rectifier 78, and second the load winding 50 and the self-saturating rectifier 80, are interconnected with the load resistor 20 and with the secondary winding section 72 of the transformer 66 in a similar manner.

Also, as is well known in the art, load rectifiers 82 and 84 are provided in order to produce a direct-current voltage across the load resistor 18. In order to produce a direct-current voltage across the load resistor 20, load rectifiers 86 and 88 are provided.

As illustrated, the bias windings 32, 34, 52 and 54 are connected in series circuit relationship with one another and with an adjustable resistor 90, the series circuit being connected to conductors 92 and 92′ which have applied thereto a direct-current voltage. The function of the adjustable resistor 90 is to effect a change in the magnitude of the current flow through the bias windings 32, 34, 52 and 54 and thus a change in the magnitude of the output of the magnetic amplifiers 14 and 16. In practice, the magnetic amplifiers 14 and 16 are biased to half output.

Referring again to the compensating magnetic amplifier 12, the compensating magnetic amplifier 12 in this instance comprises two doubler-type magnetic amplifiers 94 and 96 of the self-saturating type. However, other known suitable types of magnetic amplifiers could be utilized. As is customary, the doubler-type magnetic amplifier 94 comprises magnetic core members 98 and 100 which have disposed in inductive relationship therewith load windings 102, 104, respectively, bias windings 106 and 108, respectively, and control windings 110 and 112, respectively. On the other hand, the doubler-type magnetic amplifier 96 comprises magnetic core members 114 and 116 which have disposed in inductive relationship therewith load windings 118 and 122, respectively, bias windings 122 and 124, respectively, and control windings 126 and 128, respectively.

Self-saturation is obtained for the doubler-type magnetic amplifier 94 by connecting self-saturating rectifiers 130 and 132 in series circuit relationship with the load windings 102 and 104, respectively. In like manner, self-saturation for the doubler-type magnetic amplifier 96 is obtained by connecting self-saturating rectifiers 134 and 136 in series circuit relationship with the load windings 118 and 120, respectively. Energization for the load windings 102, 104, 118 and 120 is obtained by interconnecting these series circuits with the conductors 64 and 64′ by means of a bridge-type full-wave rectifier 138.

In accordance with a teaching of this invention, the compensating magnetic amplifier 12 is so constructed and so interconnected with the push-pull magnetic amplifier 10 that only until the control voltage applied to the control windings 110, 112, 126 and 128 of the amplifier 12 reaches a predetermined value in either the positive or negative direction does the output current of the compensating magnetic amplifier 12, and thus the current flow through the auxiliary bias windings 62, 60, 42 and 40, increase with an increase in the magnitude of the control voltage applied to the control windings 110, 112, 126 and 128. The point at which the control voltage applied to the control windings 110, 112, 126 and 128 reaches the predetermined value in one direction corresponds to the cutoff value for the magnetic amplifier 14 and the point at which the control voltage reaches the predetermined value in the other direction corresponds to the cutoff value for the magnetic amplifier 16, of the push-pull magnetic amplifier 10. In other words, the bias ampere-turns produced by the auxiliary bias windings of either the magnetic amplifier 14 or 16, depending upon which side the push-pull magnetic amplifier 10 is being driven down, oppose and cancel the control ampere-turns above the value required to cut off the particular magnetic amplifier.

In the embodiment of Fig. 1, the above-mentioned result of canceling excessive control ampere-turns is accomplished in general by biasing both sides of the compensating magnetic amplifier 12 to cutoff, rendering both the push-pull magnetic amplifier 10 and the compensating magnetic amplifier 12 responsive to the same control voltage, and by rendering the push-pull magnetic amplifier 10 responsive to the output of the compensating magnetic amplifier 12.

In order to be able to vary the magnitude of the current through the bias windings 106, 108, 122 and 124 of the compensating magnetic amplifier 12, these bias windings are connected in series circuit relationship with an adjustable resistor 140. As shown, the series circuit is connected to the conductors 92 and 92′, the voltage across which must be of sufficient magnitude to simultaneously bias both the magnetic amplifiers 95 and 96 of the compensating magnetic amplifier 12 off when substantially no current is flowing through the associated control windings 110, 112, 126 and 128. The width of the dead zone, that is when the compensating magnetic amplifier 12 has substantially no output, can be varied by adjusting the positioning of the resistor 140.

In this instance, the control windings 36, 38, 56 and 58 of the push-pull magnetic amplifier 10 and the control windings 110, 112, 126 and 128 of the compensating magnetic amplifier 12 are rendered responsive to the same control voltage by connecting the control windings 36, 38, 56 and 58 of the magnetic amplifier 10 in series circuit relationship with the control windings 110, 112, 126 and 128, of the compensating magnetic amplifier 12. This series circuit is connected to the output of a potentiometer bridge 142 whose input is connected to the conductors 92 and 92′. As illustrated, the potentiometer bridge 142 comprises an adjustable resistor 144 having a movable contact member 146, and an adjustable resistor 148 having a movable contact member 150. As is well known in the art, by simultaneously actuating the movable contact members 146 and 150, the magnitude and the polarity of the output or control voltage of the potentiometer bridge can be changed. Thus, the magnitude and the direction of the current flow through the control windings 58, 56, 38, 36, 110, 112, 126 and 128 are determined by the positioning of the movable contact members 146 and 150 of the potentiometer bridge 142.

Figure 3:
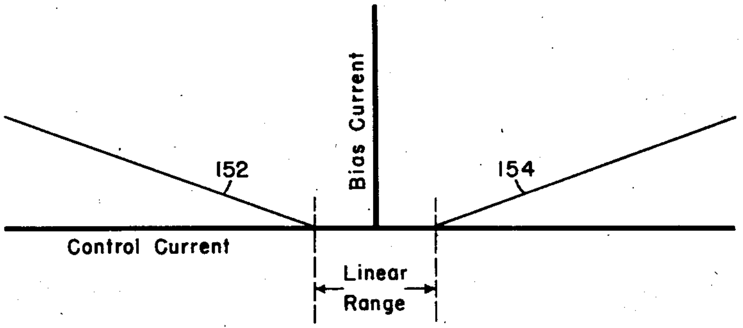
Fig. 3 is a graph illustrating the manner in which the output current of the compensating magnetic amplifier illustrated in Fig. 1 varies with changes in the magnitude of the control current applied thereto.

The auxiliary bias windings 40, 42, 60 and 62 of the push-pull magnetic amplifier 10 are responsive to the output of the compensating magnetic amplifier 12. In particular, the auxiliary bias windings 40, 42, 60 and 62 are connected in series circuit relationship with one another, the series circuit being connected to the output of the rectifier 138. However, in operation, there is substantially no current flow through the auxiliary bias windings 40, 42, 60 and 62 until the cutoff value for either the magnetic amplifier 14 or 16 of the push-pull magnetic amplifier 10 is reached. In other words, as long as either the magnetic amplifier 14 or 16 is operating over its linear range, there will be substantially no current flow through the auxiliary bias windings 40, 42, 60 and 62. This can be better understood by referring to Fig. 3 in which the curves 152 and 154 represent the manner in which the current flow through the auxiliary bias windings 40, 42, 60 and 62 increases linearly, once the magnitude of the control current through the control windings 110, 112, 126 and 128 of the compensating magnetic amplifier 12 reaches a predetermined value in either the positive or negative direction.

Thus in practice, the bias windings 106, 108, 122 and 124, of the amplifier 12, are so disposed on their respective magnetic core members 98, 100, 114 and 116 that current flow therethrough produces a magnetomotive force that opposes the magnetomotive force produced by the current flow through the associated load windings 102, 104, 118 and 120, respectively, to thereby bias the magnetic amplifiers 94 and 96 off. On the other hand, the control windings 110 and 112 of the magnetic amplifier 94, and the control windings 126 and 128 of the magnetic amplifier 96, are so disposed and interconnected that current flow therethrough of a predetermined value produces opposite effects in the magnetic amplifiers 94 and 96. That is, when the voltage across the control windings 110, 112, 126 and 128 is of one polarity and of a predetermined value, one of the magnetic amplifiers 94 or 96 is driven up and away from cutoff. On the other hand, the opposite action takes place when the polarity of the voltage across the control windings 110, 112, 126 and 128 is reversed and reaches a predetermined value.

The operation of the apparatus illustrated in Fig. 1 will now be described. Assume the potentiometer bridge 142 is unbalanced in such a direction as to effect a current flow from the movable contact member 150 of the potentiometer bridge 142, through the control windings 58, 56, 38 and 36 of the push-pull magnetic amplifier 10, and the control windings 110, 112, 126 and 128 of the compensating magnetic amplifier 12, to the movable contact member 146. Such a current flow effects an increase in the impedance of the load windings 48 and 50 of the magnetic amplifier 16 and a decrease in the impedance of the load windings 28 and 30 of the magnetic amplifier 14, to thereby drive the magnetic amplifier 14 up and the magnetic amplifier 16 down.

Assuming the same unbalanced condition of the bridge 142, the current flow through the control windings 110, 112, 126 and 128 of the compensating magnetic amplifier 12, if of a predetermined value to drive the magnetic amplifier 16 to its cutoff value, effects a decrease in the impedance of the load windings 118 and 120 of the magnetic amplifier 96. A decrease in the impedance of the load windings 118 and 120 increases the magnitude of the output current of the compensating magnetic amplifier 12 and thus an increase in the magnitude of the current flow through the auxiliary bias windings 62 and 60 of the magnetic amplifier 16. As the current flow through the control windings 58 and 56 tends to drive the magnetic amplifier 16 beyond its cutoff value, the current flow through the auxiliary bias windings 62 and 60 effects a flux in the magnetic core members 46 and 48, respectively, which opposes the flux produced by the current flow through the control windings 58 and 56, respectively. Thus, the auxiliary bias windings 62 and 60 in effect cancel the excessive ampere-turns produced by the control windings 58 and 56. This can be better understood by referring to Fig. 2 in which a curve 156 represents the characteristic curve for the magnetic amplifier 16, and a curve 158 represents the characteristic curve for the magnetic amplifier 14, of the push-pull magnetic amplifier 10. The combined characteristic curve for the push-pull magnetic amplifier 10 is represented by a curve 160.

As hereinbefore mentioned, the magnetic amplifiers 14 and 16 of the push-pull magnetic amplifier 10 are each biased to approximately half output. The bias ampere-turns are represented by the vectors 162 and 164, respectively. The control ampere-turns of the magnetic amplifiers 14 and 16 are represented by the vectors 166 and 168, respectively. On the other hand, the auxiliary bias ampere-turns produced by the auxiliary bias windings of the magnetic amplifiers 14 and 16 are represented by vectors 170 and 172, respectively.

Figure 2:
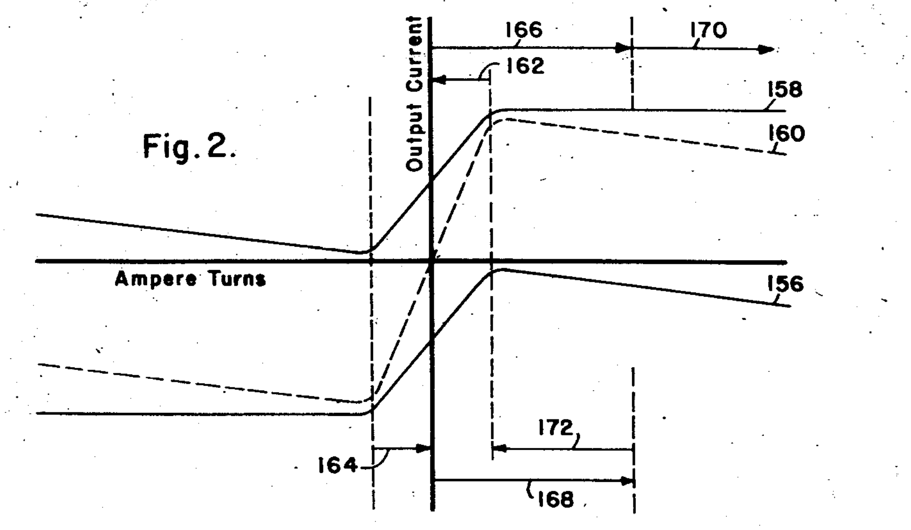
Fig. 2 is a graph illustrating the manner in which the bias ampere-turns applied to the main magnetic amplifier illustrated in Fig. 1 cancel out the excessive control ampere-turns applied to the main magnetic amplifier, to thereby prevent the main magnetic amplifier from being driven beyond its cutoff value.

As can be seen from Fig. 2, the auxiliary bias ampere-turns produced by the auxiliary bias windings 60 and 62 of the magnetic amplifier 16 oppose the control ampere-turns as produced by the control windings 58 and 56, to thereby prevent the magnetic amplifier 16 from being driven beyond its cutoff value. In operation, when the magnetic amplifier 16 reaches its cutoff value, the magnetic amplifier 14 becomes substantially completely saturated. Therefore, even though the auxiliary bias ampere-turns as represented by the vector 170 of the magnetic amplifier 14 are additive to the ampere-turns as effected by the control windings 36 and 38, the output of the magnetic amplifier 14 is unaffected by such an addition.

Assuming the polarity of the output voltage of the potentiometer bridge 142 is reversed, then current will flow from the movable contact member 146 through the control windings 128, 126, 112 and 110 of the compensating magnetic amplifier 12, and the control windings 36, 38, 56 and 58 of the push-pull magnetic amplifier 10, to the movable contact member 150 of the potentiometer bridge 142. Such a current flow drives the magnetic amplifier 14, of the push-pull magnetic amplifier 10, down and the magnetic amplifier 16 up. On the other hand, such a current flow through the control windings 112 and 110 of the magnetic amplifier 94 if of a predetermined value effects a driving of the magnetic amplifier 94 up and away from cutoff.

When the current flow through the control windings 112 and 110 of the magnetic amplifier 94 reaches the predetermined value, the output from the rectifier 138 increases to thereby effect a current flow through the auxiliary bias windings 42 and 40 of the magnetic amplifier 14, of the push-pull amplifier 10. This current flow through the auxiliary bias windings 42 and 40 produces bias ampere-turns which oppose and cancel out the control ampere-turns produced by the control windings 36 and 38 beyond the value required to cut off the magnetic amplifier 14.

In Fig. 1 of the drawings, when the contact 150 is positive and the contact 146 is negative, the flux set up in the cores is indicated by the dotted arrows. When the contact 150 is negative and the contact 146 is positive, the flux set up in the cores is indicated by the solid arrows.

Figure 4:
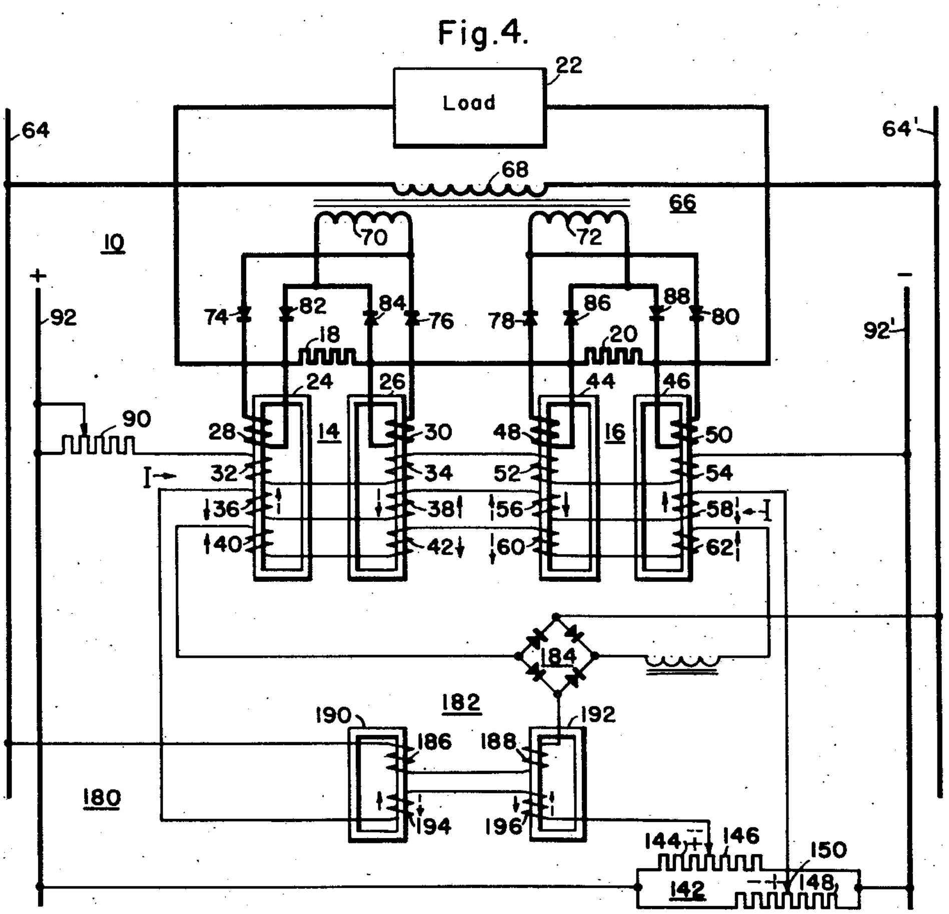
Fig. 4 is a schematic diagram of circuits and apparatus illustrating another embodiment of this invention.

Referring to Fig. 4, there is illustrated another embodiment of this invention in which like components of Figs. 1 and 4 have been given the same reference characters. The main distinction between the apparatus of Figs. 1 and 4 is that in the apparatus of Fig. 4 a different type of compensating magnetic amplifier is shown. In particular, a compensating magnetic amplifier 180, comprising a simple series-connected magnetic amplifier 182 and a bridge-type rectifier 184 having a predetermined threshold voltage, is provided.

In the apparatus of Fig. 4, the dead zone, that is when the current flow through the auxiliary bias windings 40, 42, 60 and 62 of the push-pull magnetic amplifier 10 is substantially zero, is obtained by depending upon the bridge rectifier 184 having a predetermined threshold voltage. The magnitude of this dead zone can be varied by changing the magnitude of the alternating-current supply voltage applied to the load windings 186 and 188 of the magnetic amplifier 182. The high resistance of the bridge rectifier 184 operating below the threshold voltage causes the current flow through the auxiliary bias windings 62, 60, 42 and 40 of the amplifier 10 to be very low in the dead zone. Variations in the residual bias, as applied to the push-pull magnetic amplifier 10, will cause practically no change in the gain of the magnetic amplifier 10 since it is very insensitive to small changes in bias in its linear regions of operation. Further, variations in the threshold point of the rectifier 184 will have little effect so long as the threshold voltage is beyond the linear region of the push-pull magnetic amplifier 10.

Energization for the load windings 186 and 188 of the magnetic amplifier 182 is obtained by interconnecting the load windings 186 and 188 with the conductors 64 and 64' by means of the rectifier 184. As illustrated, the load windings 186 and 188 are disposed in inductive relationship with magnetic core members 190 and 192, respectively. Also disposed in inductive relationship with the magnetic core members 190 and 192 are control windings 194 and 196, respectively.

In order to render the control windings 36, 38, 56 and 58 of the push-pull magnetic amplifier 10, and the control windings 194 and 196, of the compensating magnetic amplifier 180, responsive to the same control voltage, the control windings 196, 194, 36, 38, 56 and 58 are connected in series circuit relationship with one another, the series circuit being connected to the movable contact members 146 and 150 of the potentiometer bridge 142. On the other hand, in order to render the auxiliary bias windings 40, 42, 60 and 62 of the push-pull magnetic amplifier 10 responsive to the output of the compensating magnetic amplifier 180, the series circuit including the auxiliary bias windings 40, 42, 60 and 62 is connected to the output of the rectifier 184.

The operation of the apparatus of Fig. 4 will now be described. Assuming the potentiometer bridge 142 is unbalanced in a direction whereby current flows from the movable contact member 150 through the control windings 58, 56, 38 and 36 of the push-pull magnetic amplifier 10, and the control windings 194 and 196 of the compensating magnetic amplifier 180, to the movable contact member 146, then the magnetic amplifier 16 of the push-pull magnetic amplifier 10 will be driven down and the magnetic amplifier 14 will be driven up. However, once the magnetic amplifier 16 has been driven to its cutoff value, then the threshold voltage of the rectifier 184 will have been reached, whereby the output of the rectifier 184 increases to thus effect a corresponding increase in the current flow through the auxiliary bias windings 62 and 60 of the magnetic amplifier 16. The bias ampere-turns produced by the current flow through the auxiliary bias windings 62 and 60 oppose and cancel out the control ampere-turns produced by the control windings 58 and 60 above the value required to cut off the magnetic amplifier 16. Thus, the magnetic amplifier 16 is prevented from being driven beyond its cutoff value.

Under the assumed conditions, when the movable contact member 150 is at a positive polarity with respect to the movable contact member 146 of the potentiometer bridge 142, the bias ampere-turns produced by the current flow through the auxiliary bias windings 42 and 40 are additive to the control ampere-turns produced by the current flow through the control windings 38 and 36. However, since the magnetic amplifier 14 has already been driven to saturation, a further increase in ampere-turns in the direction of positive saturation will not affect the magnitude of its output.

Assuming the polarity of the output voltage of the potentiometer bridge 142 is reversed, then the magnetic amplifier 14 will be driven towards cutoff and the magnetic amplifier 16 will be driven towards positive saturation. However, once the threshold voltage of the rectifier 184 is reached, the auxiliary bias windings 42 and 40 will effect bias ampere-turns which oppose and cancel out the control ampere-turns produced by the control windings 38 and 36 beyond the value required to cut off the magnetic amplifier 14. Therefore, the magnetic amplifier 14 is prevented from being driven beyond its cutoff value. Since the remaining operation of the apparatus of Fig. 4 is similar to the operation of the apparatus of Fig. 1, a further description of such operation is deemed unnecessary.

In Fig. 4, when the contact 150 is positive and the contact 146 is negative, the flux set up in the cores is indicated by the dotted arrows. When the contact 150 is negative and the contact 146 is positive, the flux set up in the cores is indicated by the solid arrows.

It is to be noted that the gain of both the compensating magnetic amplifier 12 and the compensating magnetic amplifier 180 should be extremely small compared to the gain of the push-pull magnetic amplifier 10. If this condition is adhered to, the control windings of the particular compensating magnetic amplifier can have a very low resistance, and the power output of the compensating magnetic amplifiers can be very small since only auxiliary bias current is supplied to the push-pull magnetic amplifier 10. Note also that in regulators where a single-ended amplifier is used instead of a push-pull amplifier, the compensating amplifier needs to provide bias compensation only in one direction, even though the error may become very large in both directions. Also, where the control ampere turns are likely to get very large in only one direction, only one self-saturating magnetic amplifier need be provided for the compensating magnetic amplifier. It is also to be noted that this invention can be practiced to overcome the effects of large control ampere-turns which are the difference between the ampere-turns on two or more control windings (not shown). In this case it is necessary to use as many control windings (not shown) on each core of the compensating amplifier (not shown) as are used on each core of the main amplifier (not shown).

Since certain changes may be made in the above apparatus and circuits, and different embodiments of the invention may be made without departing from the scope thereof, it is intended that all matter contained in the above description and shown in the accompanying drawings shall be interpreted as illustrative and not in a limiting sense.

I claim as my invention:

1. In an amplifier connected to be energized from a supply voltage and responsive to a control voltage to supply energy to a load, the combination comprising, a main magnetic amplifier including magnetic core means, a load winding and control means disposed in inductive relationship with the magnetic core means, the load winding being energized from said supply voltage and interconnected with said load, a compensating magnetic amplifier having a control winding and an output, circuit means for rendering the control winding of the compensating magnetic amplifier and said control means responsive to said control voltage, and means for interconnecting the output of the compensating magnetic amplifier with the said control means, the compensating magnetic amplifier being such that only until the said control voltage reaches a predetermined value does the output current of the compensating magnetic amplifier increase with an increase in the said control voltage, whereby the main magnetic amplifier is prevented from being driven beyond its cutoff value.

2. In an amplifier connected to be energized from a supply voltage and responsive to a control voltage to supply energy to a load, the combination comprising, a main magnetic amplifier including magnetic core means, a load winding, a control winding, and a bias winding disposed in inductive relationship with the magnetic core means, the load winding being energized from said supply voltage and interconnected with said load, a compensating magnetic amplifier having a control winding and an output, circuit means for rendering the control winding of the compensating magnetic amplifier and the control winding of the main magnetic amplifier responsive to said control voltage, and means for interconnecting the output of the compensating magnetic amplifier with the bias winding of the main magnetic amplifier, the compensating magnetic amplifier being such that only until the said control voltage reaches a predetermined value does the bias current increase with an increase in the said control voltage, whereby the bias ampere-turns oppose and cancel the control ampere-turns added to the main magnetic amplifier after said predetermined value is exceeded.

3. In an amplifier connected to be energized from a supply voltage and responsive to a control voltage to supply energy to a load, the combination comprising, a main magnetic amplifier including magnetic core means, a load winding, a control winding, and a bias winding disposed in inductive relationship with the magnetic core means, the load winding being energized from said supply voltage and interconnected with said load, a compensating magnetic amplifier having a control winding and an output, circuit means for connecting the control winding of the compensating magnetic amplifier and the control winding of the main magnetic amplifier in series circuit relationship with one another and for rendering the control winding of the compensating magnetic amplifier and the control winding of the main magnetic amplifier responsive to said control voltage, and means for interconnecting the output of the compensating magnetic amplifier with the bias winding of the main magnetic amplifier, the compensating magnetic amplifier being such that only until the said control voltage reaches a predetermined value does the bias current increase with an increase in the said control voltage, whereby the bias ampere-turns oppose and cancel the control ampere-turns added to the main magnetic amplifier after said predetermined value is exceeded.

4. In an amplifier connected to be energized from a supply voltage and responsive to a control voltage to supply energy to a load, the combination comprising, a main magnetic amplifier including magnetic core means, a load winding, a control winding, and a bias winding disposed in inductive relationship with the magnetic core means, the load winding being energized from said supply voltage and interconnected with said load, a compensating magnetic amplifier having an output device having a predetermined threshold voltage and a control winding for controlling the output voltage of the output device, circuit means for rendering the control winding of the main magnetic amplifier and the control winding of the compensating magnetic amplifier responsive to said control voltage, and means for interconnecting the bias winding of the main magnetic amplifier with the output of said output device, the current flowing through the bias winding increasing with an increase in the said control voltage once the threshold voltage of the said output device is reached, whereby the bias ampere-turns oppose and cancel the control ampere-turns added to the main magnetic amplifier after said threshold voltage is exceeded.

5. In an amplifier connected to be energized from a supply voltage and responsive to a control voltage to supply energy to a load, the combination comprising, a main magnetic amplifier including magnetic core means, a load winding, a control winding, and a bias winding disposed in inductive relationship with the magnetic core means, the load winding being energized from said supply voltage and interconnected with said load, a compensating magnetic amplifier including a bridge rectifier having an output and a predetermined threshold voltage, and a control winding for controlling the output voltage of the bridge rectifier, circuit means for rendering the control winding of the main magnetic amplifier and the control winding of the compensating magnetic amplifier responsive to said control voltage, and means for interconnecting the bias winding of the main magnetic amplifier with the output of the bridge rectifier, the current flowing through the bias winding increasing with an increase in the said control voltage once the threshold voltage of the bridge rectifier is reached, whereby the bias ampere-turns oppose and cancel the control ampere-turns added to the main magnetic amplifier after said threshold voltage is exceeded.

6. In an amplifier connected to be energized from a supply voltage and responsive to a control voltage to supply energy to a load, the combination comprising, a main magnetic amplifier including magnetic core means, a load winding, a control winding, and a bias winding disposed in inductive relationship with the magnetic core means, the load winding being energized from said supply voltage and interconnected with said load, a compensating magnetic amplifier including a bridge rectifier having an output and a predetermined threshold voltage, and a control winding for controlling the output voltage of the bridge rectifier, circuit means for connecting the control winding of the main amplifier and the control winding of the compensating amplifier in series circuit relationship with one another and for rendering the control winding of the main magnetic amplifier and the control winding of the compensating magnetic amplifier responsive to said control voltage, and means for interconnecting the bias winding of the main magnetic amplifier with the output of the bridge rectifier, the current flowing through the bias winding increasing with an increase in the said control voltage once the threshold voltage of the bridge rectifier is reached, whereby the bias ampere-turns oppose and cancel the control ampere-turns added to the main magnetic amplifier after said threshold voltage is exceeded.

7. In an amplifier connected to be energized from a supply voltage and responsive to a control voltage to supply energy to a load, the combination comprising, a main magnetic amplifier including magnetic core means, a load winding, a control winding, and a bias winding disposed in inductive relationship with the magnetic core means, the load winding being energized from said supply voltage and interconnected with said load, a compensating magnetic amplifier having an output and including means for biasing the compensating magnetic amplifier to cutoff, and a control winding for driving the compensating magnetic amplifier away from cutoff once the current flow through the control winding of the compensating magnetic amplifier reaches a predetermined value, circuit means for rendering the control winding of the main magnetic amplifier and the control winding of the compensating magnetic amplifier responsive to said control voltage, and means for interconnecting the bias winding of the main magnetic amplifier with the output of the compensating magnetic amplifier, the current flowing through the bias winding increasing with an increase in the said control voltage once said predetermined value is reached, whereby the bias ampere-turns oppose and cancel the control ampere-turns added to the main magnetic amplifier after said predetermined value is reached.

8. In an amplifier connected to be energized from a supply voltage and responsive to a control voltage to supply energy to a load, the combination comprising, a main magnetic amplifier including magnetic core means, a load winding, a control winding, and a bias winding disposed in inductive relationship with the magnetic core means, the load winding being energized from said supply voltage and interconnected with said load, a compensating magnetic amplifier having an output and including means for biasing the compensating magnetic amplifier to cutoff, and a control winding for driving the compensating magnetic amplifier away from cutoff once the current flow through the control winding of the compensating magnetic amplifier reaches a predetermined value, circuit means for connecting the control winding of the main magnetic amplifier and the control winding of the compensating magnetic amplifier in series circuit relationship with one another and for rendering the control winding of the main magnetic amplifier and the control winding of the compensating magnetic amplifier responsive to said control voltage, and means for interconnecting the bias winding of the main magnetic amplifier with the output of the compensating magnetic amplifier, the current flowing through the bias winding increasing with an increase in the said control voltage once said predetermined value is reached, whereby the bias ampere-turns oppose and cancel the control ampere-turns added to the main magnetic amplifier after said predetermined value is reached.

References Cited in the file of this patent

UNITED STATES PATENTS

| | | |
|---|---|---|
| 2,555,992 | Ogle | June 5, 1951 |
| 2,635,223 | Grillo | Apr. 14, 1953 |
| 2,640,098 | Grillo | May 26, 1953 |